(12) United States Patent
Munje et al.

(10) Patent No.: US 9,146,924 B2
(45) Date of Patent: Sep. 29, 2015

(54) APPARATUS AND METHOD FOR CREATING, ADDRESSING AND MODIFYING RELATED DATA

(75) Inventors: Arun Munje, Ottawa (CA); Shailesh Kaul, Ottawa (CA)

(73) Assignee: Vayyoo Inc., Ottawa (CA)

( * ) Notice: Subject to any disclaimer, the term of this patent is extended or adjusted under 35 U.S.C. 154(b) by 391 days.

(21) Appl. No.: 12/551,382

(22) Filed: Aug. 31, 2009

(65) Prior Publication Data

US 2010/0058217 A1     Mar. 4, 2010

Related U.S. Application Data

(63) Continuation-in-part of application No. 12/505,988, filed on Jul. 20, 2009.

(60) Provisional application No. 61/093,040, filed on Aug. 29, 2008.

(51) Int. Cl.
 *G06F 17/30* (2006.01)

(52) U.S. Cl.
 CPC ...... *G06F 17/3002* (2013.01); *G06F 17/30032* (2013.01); *G06F 17/30056* (2013.01)

(58) Field of Classification Search
 None
 See application file for complete search history.

(56) References Cited

U.S. PATENT DOCUMENTS

| | | | |
|---|---|---|---|
| 6,741,864 B2 * | 5/2004 | Wilcock et al. | 455/456.1 |
| 6,914,626 B2 * | 7/2005 | Squibbs | 348/231.3 |
| 7,302,254 B2 * | 11/2007 | Valloppillil | 455/414.1 |
| 7,305,354 B2 * | 12/2007 | Rodriguez et al. | 705/26.41 |
| 7,818,336 B1 | 10/2010 | Amidon et al. | |
| 7,945,470 B1 | 5/2011 | Cohen et al. | |
| 2002/0087622 A1 * | 7/2002 | Anderson | 709/203 |
| 2004/0054711 A1 * | 3/2004 | Multer | 709/201 |
| 2004/0250205 A1 * | 12/2004 | Conning | 715/517 |
| 2005/0278371 A1 * | 12/2005 | Funk et al. | 707/102 |
| 2007/0035612 A1 | 2/2007 | Korneluk et al. | |
| 2007/0229678 A1 | 10/2007 | Barrus et al. | |
| 2008/0052349 A1 * | 2/2008 | Lin | 709/203 |
| 2008/0082405 A1 | 4/2008 | Martinez et al. | |
| 2008/0239329 A1 * | 10/2008 | Kitada et al. | 358/1.1 |
| 2009/0005010 A1 * | 1/2009 | Dote et al. | 455/412.1 |
| 2009/0037519 A1 * | 2/2009 | Young | 709/203 |
| 2009/0100070 A1 | 4/2009 | Quartararo | |
| 2009/0204885 A1 * | 8/2009 | Ellsworth et al. | 715/234 |
| 2010/0017433 A1 | 1/2010 | Munje et al. | |

OTHER PUBLICATIONS

McKillop, "How to automatically upload pictures from your mobile phone to Flickr", Oct. 1, 2007, http://www.simplehelp.net/2007/10/01/how-to-automatically-upload-pictures-from-your-mobile-phone-to-flickr/.*
Trapani, "Geek to Live: Flickr Advanced User Guide", Feb. 15, 2006, http://lifehacker.com/154849/geek-to-live-flickr-advanced-user-guide.*
Trapani, "Tips for Flickr beginners", Feb. 2, 2005, http://lifehacker.com/31935/tips-for-flickr-beginners.*

(Continued)

*Primary Examiner* — Matt Kim
*Assistant Examiner* — Mahelet Shiberou

(57) ABSTRACT

A method for creating a structured data collection comprising collecting at least two data components using a data capture device assigning the same unique identifier to all of the data components whereby the items of data identified by the same unique identifier form a bundle of data.

24 Claims, 5 Drawing Sheets

(56) References Cited

OTHER PUBLICATIONS flickr.com, "Help / FAQ / Photos", Mar. 19, 2007, http://web.archive.org/web/20070319181829/http://www.flickr.com/help/photos/.*
eHow.com, "How to Upload Photos on Flickr", Jan. 23, 2008, http://web.archive.org/web/20080123114515/http://www.ehow.com/how_2031218_upload-photos-flickr.html.*
wikipedia.org, "Photo sharing", Oct. 12, 2007, http://web.archive.org/web/20071012230834/http://en.wikipedia.org/wiki/Photo_sharing.*
wikipedia.org, "Comparison of photo gallery software", Dec. 2, 2007, http://web.archive.org/web/20071202082335/http://en.wikipedia.org/wiki/Comparison_of_photo_gallery_software.*
Mitch Bartlett, iPhone: How to Send MMS Text Message, Aug. 22, 2009.*
Office Action dated Feb. 27, 2014 for U.S. Appl. No. 12/505,988, which is the parent of the present application.
Office Action dated Jun. 5, 2013 for U.S. Appl. No. 12/505,988, which is the parent of the present application.
Office Action dated Apr. 4, 2012 for U.S. Appl. No. 12/505,988 which is the parent of the present application.
Office Action dated Aug. 4, 2011 for U.S. Appl. No. 12/505,988, which is the parent of the present application.

* cited by examiner

APPARATUS AND METHOD FOR CREATING, ADDRESSING AND MODIFYING RELATED DATA

CROSS-REFERENCE TO RELATED APPLICATIONS

This application is a continuation-in-part of U.S. application Ser. No. 12/505,988 filed Jul. 20, 2009 and claims priority and benefit from U.S. Provisional Patent Application No. 61/093,040 filed Aug. 29, 2008 for Method and Apparatus for Data Capture and Transmission

MICROFICHE APPENDIX

Not applicable.

TECHNICAL FIELD

This application relates to creating a new "data pack" that bundles related data, and provides an auditable and searchable record of more useful data than the independent data it consists of. The application also relates to an apparatus and method for creating, addressing and modifying related data which is particularly useful for devices that are capable of capturing multiple kinds of data and make it easy to correlate them. The present invention also relates to user interface controls in computers and mobile data communications devices and, more particularly, to methods, systems, and computer program products for the efficient and facile capture, annotation, transmission and manipulation of interrelated data sets.

BACKGROUND OF THE APPLICATION

As the technology develops creating newer types of data, and there are more ways to capture these, the amount of data is also increasing. Relating the related data is becoming more and more challenging, and it is clear that the value of data can increase significantly if it is correlated with more information.

The advent and subsequent rapid evolution in the communications and data capture capabilities of small computers and mobile communication devices has reached a level of functional integration that is catalysing an entirely novel range of usage possibilities which revolve around the remote collection and transmission of recorded multimedia and other relatively large format data objects.

Currently available portable devices inexpensively combine video and still image capture, voice recording, data communications and even location acquisition technologies into a "shirt pocket" physical footprint, and the enabling wireless communications networks and supporting services have been built out to the point of effective near-ubiquity in many parts of the world. While portable devices have increasingly advanced data capture peripherals integrated, their user input/output interfaces have not kept pace, and are of necessity confined and ergonomically challenging.

The very small physical dimensions of the devices themselves have led to a nascent operational barrier to the widespread leveraging of these devices toward the creation and manipulation of usefully annotated data objects from the field, namely that the user semantics and control sequences of the prevalent Windows, Icons, Menu, and Pointing Device paradigm which characterise much human-computer interaction often do not translate well to the small format, limited resolution readouts and miniature input devices of a portable unit.

For example, transmitting even a single still image to a correspondent over electronic mail typically requires that the operator invoke a chain of user interface interactions; framing and executing the capture using the imaging software, accessing the email client application, therein originating and addressing an email message, referencing and attaching the image object to the message, and sending the resulting compound over the network. Should positional, descriptive or other information be desired as an annotation, a further chain of interactions with any number of other pertinent user interfaces would be needed. While such elaborate control sequences are arguably manageable within the relatively comfortable ergonomics of desktop workstation or other well appointed system's control and data input hardware, they can be quite time consuming, awkward and error-prone in a handheld or other constrained environment. Transmitting multiples images is even more involved than transmitting a single image.

Accordingly, there is a need for a fast and simple to use operator interface for mobile small computers and communication devices, which can allow association and manipulation of complex data for transmission, while minimising the degree of direct operator data entry and control interactions.

SUMMARY

In one aspect, the present invention relates to a method suitable for creating a structured data collection using a data capture device. The method can further include the step of automatically populating data and Meta Data for the collection, the step of a user manually providing data to be included in the DataPack, or the step of providing another component collecting data as data to be included in the DataPack.

In another aspect, the present inventions relates to a method suitable for assigning a unique identifier to the DataPack bundle. The uniqueness of the identifier is an important aspect for addressability of the DataPack. In order to achieve the uniqueness, the identifier could be based on the combination of the timestamp of when the DataPack was created; a unique identifier of the data capture device itself, e.g. IMEI or BlackBerry Device PIN; or any unique identifier retrieved from the user account of the user of the device. It is also possible to include an identifier assigned by a server that it can communicate with. Either a hash of the above sources of the identifier may be used, or a simple combination of the keys can be used.

The DataPack created can be bundled in a number of different ways, where the individual parts of the bundle are easily identified as being part of the bundle. Examples of bundling according to the present invention include keeping the attachments and related information of the bundle with a folder named using a DataPack identifier. Other representation could be with XML that supports binary data as well. Embodiments of the present invention include a binary stream of data that has predefined types with known lengths, which optimizes parsing and at the same time optimizes total binary size to be suitable for wireless environment.

In another aspect, the present invention relates to a method suitable for updating content of the structured data using a data capture device and the method step of automatically populating data and Meta Data for the collection, the step of a user manually providing data to be included in the DataPack, or the step of providing another component collecting data as data to be included in the DataPack. The method can further comprise a derived data component or attachment.

In another aspect, the present invention relates to a method suitable for maintaining the state of the DataPack created by using a data capture device and the step of automatically populating data and Meta Data for the collection, the step of a user manually providing data to be included in the Data-Pack, or the step of providing another component collecting data as data to be included in the DataPack. The method can further comprise a derived data component or attachment.

In yet another aspect, the present invention relates to a method for collecting relevant data for a particular DataPack comprising the steps of providing parameters that can be used in the DataPack as Meta Data or context, determining if a user is adding data or modifying already provided data, capturing more data while the user adds more data or modifies already provided data, and auto-populating more data for the Data-Pack if the user no longer adds more data or modifies already provided data.

In yet a further embodiment, the present invention relates to a simple to use user interface that allows users to collect and correlate data to be provided as an input to the DataPack. In one embodiment, a conventional device is configured such that one or more of the input keys or other input devices such as a trackball or touch pad on the device are used to launch applications to collect and correlate data being inputted to a DataPack. In one embodiment, dedicated keys on a smart-phone, or other handheld device like BlackBerry, are used to trigger the recording of voice or capturing images and videos. In a further embodiment, the left application key when pressed is the recording voice trigger, the right application key when pressed is the camera launcher for image or video capture, the keyboard is used for text entry, and a software library is provided as an engine to extract other relevant data for the DataPack. The apparatus provides an easy platform for users to follow methods described in this invention.

Aspects and features of the present application will become apparent to those ordinarily skilled in the art upon review of the following description of specific embodiments of an apparatus and method for creating, addressing and modifying related data in conjunction with the accompanying drawing figures.

In a further embodiment, the present invention relates to a method for creating a structured data collection comprising collecting at least two data components using a data capture device, assigning the same unique identifier to all of the data components, whereby the items of data identified by the same unique identifier form a bundle of data. At least one of the data components can be automatically populated by the data capture device. At least one of the data components can be manually inputted into the data capture device. The data component can either be collected in response to a request from the data collection device or can have previously been collected (or may be continuously collected) by a collecting module in communication with the data collecting device. The unique identifier can be the unique identifier of the data capture device, a timestamp, account information or an identifier queried from remote server communicating with the data capture device or can be a unique identifier generated from one or more the above identifiers. Once the bundle of data components is created, the individual data components can be updated and/or additional new data components added to the bundle. The data components can be an attachment. A second bundle of data can be associated to the first bundle of data as a derived attachment. The bundle of data can further includes the property of a state of the bundle and the step of maintaining the state of the bundle. At least one of the data components can be reviewed and/or modified prior to the step of assigning the unique identifier. The bundle can be sent (such as by email) to a depository location such as a server. The bundle can be addressed after its creation by using the unique identifier.

In another aspect, the present invention relates to a method of creating a data pack comprising: using a data capture device to collect data components and, assigning a unique identifier to data components to form a bundle of data components.

In a still further aspect, the present invention relates to a data capture device comprising: an electronic storage device for electronically storing data components, a data collection device for collecting data components, a processor communicatively linked to the electronic storage device and the data collection device; the processor including: an application for assigning a unique identifier to data components forming part of the same bundle of data components. The data capture device can be any suitable device for collecting data including a camera, keyboard, GPS hardware, accelerometer, or a microphone. The data components forming part of the same bundle can be stored in a folder on the storage device and the unique identifier can be assigned to the folder to identify the bundle.

In yet a further aspect, the present invention is directed to improved methods, systems, and corresponding computer program products for the efficient and facile capture, annotation, transmission and manipulation of interrelated data sets, by providing a simplified operator interface that is suitable for the tightly constrained user input/output devices typical of small mobile data communications devices. This is achieved by providing a simplified environment for the association of discrete and otherwise unrelated data objects within a transmission structure, which consists of a compound data package, herein known as the "DataPack".

According to another aspect of the present invention, a primary data capture and status interface displays a series of at least two indicator panels; the first for displaying reduced previews of captured images and digital video sequences, the second containing a type-in line for the input of textual notations, and others may be allowed for displaying iconic representations of captured binary objects, such as digital audio recordings or other file types.

According to a still further aspect, the present invention relates to a data capture user interface for a mobile device having a screen and data capture functionality comprising: a first application-having functionality to invoke the data capture functionality; and at least one preview panel for displaying a representation of one or more captured data objects on the screen.

According to yet another aspect, the present invention relates to A method of capturing and displaying data on a mobile device, the mobile device comprising a data capture device and a data capture device activator, a data capture display application and a data capture bundling application, the method comprising (a) activating the data capture device; (b) acquiring data using the data capture device; (c) displaying the captured data in a preview panel on the mobile device; (d) acquiring other data; and (e) activating the data bundling application and bundling the data acquired by the data capture device with the other data to create a Datapack.

BRIEF DESCRIPTION OF THE DRAWINGS

Embodiments of the present application will now be described, by way of example only, with reference to the accompanying drawing figures, wherein.

Like reference numerals are used in different figures to denote similar elements, where applicable.

DETAILED DESCRIPTION

Embodiments of an apparatus and method for creating, addressing and modifying related data include the following aspects of the technique, either practised on their own, or in combination.

Figure 1:
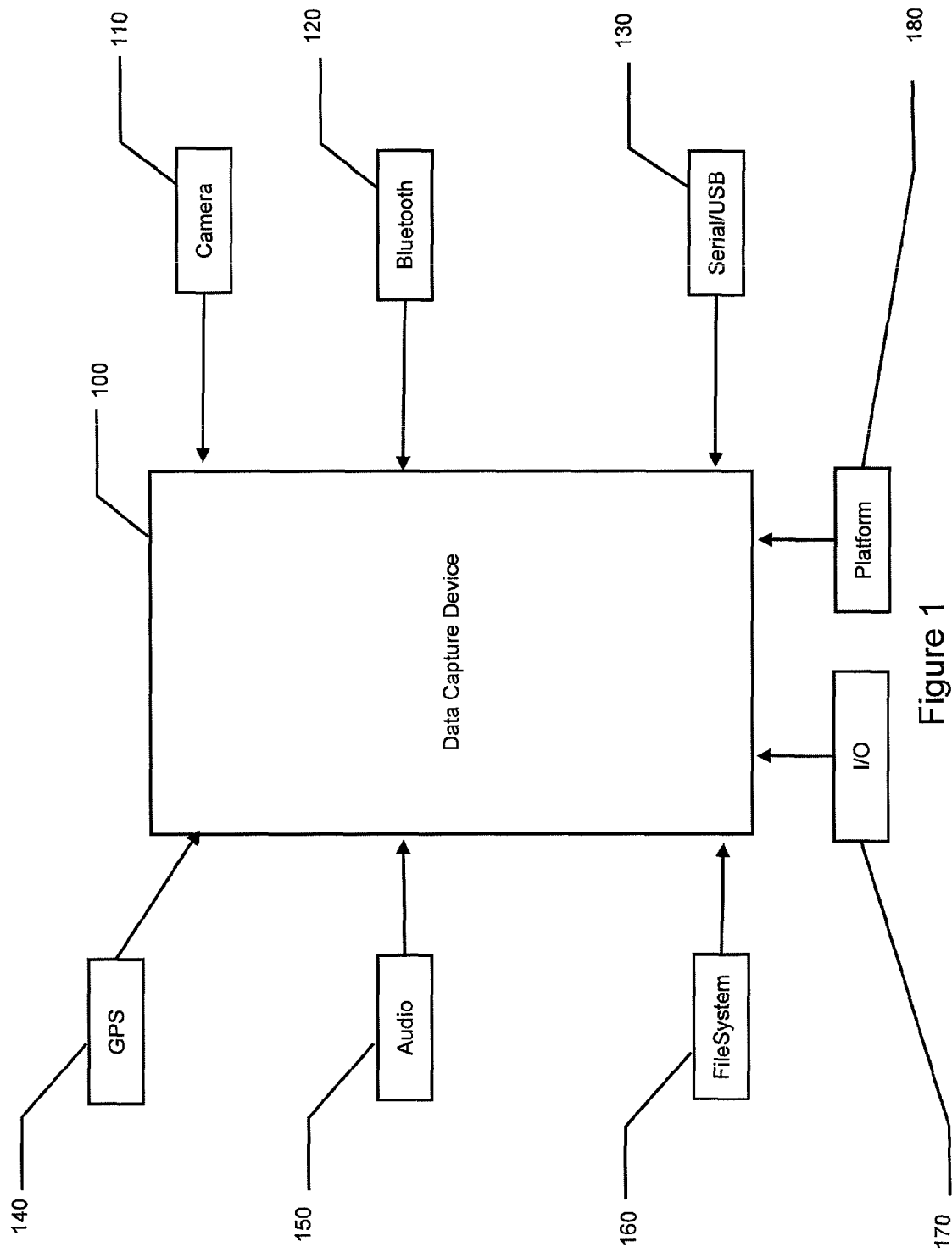
FIG. 1 depicts an embodiment of a data capture device with one or more sources of input.

Referring to the drawings, FIG. 1 depicts an embodiment of a data capture device with one or more sources of input. Several components are involved in collecting relevant data and possibly transmitting it to a server: A Data capture Device 100 may have access to sources of data, some of which are represented in the figure. An example of Data Capture Device would be a smartphone or a handheld device like BlackBerry or a Pocket PC. A built-in or an external camera 110 could be one possible source of data. The data could be an image or video that is captured by Camera 110 and made available to Data Capture Device 100 in some known format. This file may contain its own Meta Data which provides its own information about the data. Bluetooth 120 represents possible source of data from external devices which can communicate to Data Capture Device 100. This is not limited to Bluetooth technology, and could also include other technologies that enable wireless communication to peripheral devices. Serial/USB 130 represents possible source of data from external devices, which can communicate to Data Capture Device 100 over a cable. This is not limited to serial or USB technology, and could also include other technologies that enable communication to peripheral devices. GPS 140 represents a source of data that can provide location information to the Data Capture Device 100. This location information may be latitude/longitude along with other information collected using GPS devices like speed, direction, altitude etc. Additionally GPS 140 also represents other data, which helps in identifying the location, for example a cell ID, or WiFi location information. Audio 150 represents data that captures voice or other audio information. Like Camera 110, this also includes external capture device that provides audio data to Data Capture Device 100. File System 160 represents any data that is made available to the Data Capture Device 100, that had been stored in temporary or permanent memory. I/O 170 represents data that is provided by I/O like keyboard input. This includes possible context or TAGs that is retrievable by user interaction. Platform 180 represents the environment in which the Data Capture Device 100 is running. This could be data that the operating system, the hardware or a virtual machine provides.

In alternate embodiments, Data Capture Device 100 may be a custom application running on a server or a machine. The one or many data sources 110-180 could have an equivalent suitable for that environment. This will become apparent to those ordinarily skilled in the art upon review of the description of specific embodiments.

In another alternate embodiment, an application can be collecting one or more data inputs and make it available to the Data Capture Device 100, instead of the data sources directly providing data. For example, GPS 140 maybe collected periodically by a background task, so a recent GPS fix can be made available to Data Capture Device, for faster access to GPS fix.

Figure 2:
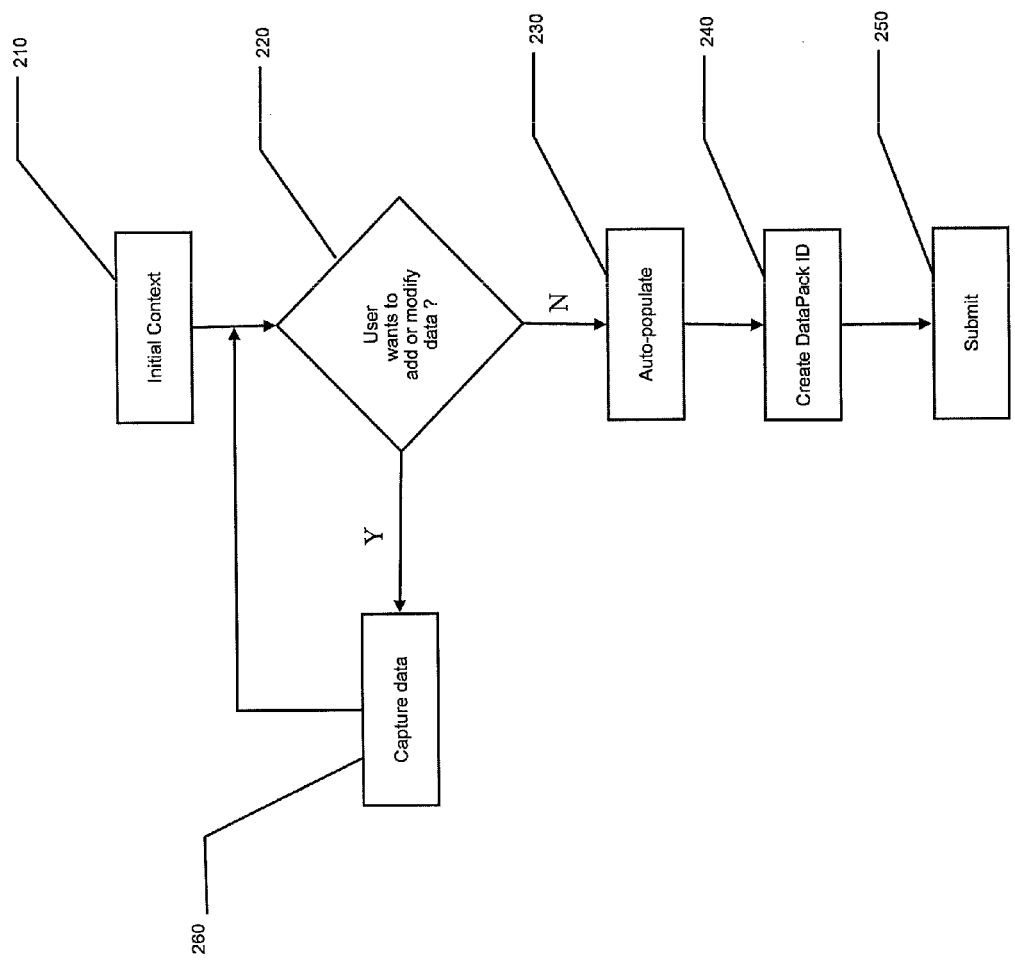
FIG. 2 depicts an example of the method according to the present invention for creating a "data pack" hereby also referred as a DataPack.

Referring to the next sheet of the drawings, FIG. 2 depicts an example of the method according to the present invention for creating a "data pack" hereby also referred as a DataPack. Initial context 210 is an opportunity for collecting relevant data for a particular DataPack. As a possible embodiment, when the application is brought into focus, it can extract or be provided parameters that can be used in the DataPack as useful Meta Data or context. 220 depicts the decision point in the flow to determine if the user intends to add or modify already provided data. While the users want to add or modify data the flow goes to 260 to capture more data. Once the user has nothing to change 220, we move on to step 230, which is another opportunity to auto-populate more data for the DataPack. An example would be to get the GPS location fix, using the timestamp or accelerometer data generated by an accelerometer attached to the device. By the time we reach Step 240, the data for the DataPack is ready and an ID is created to identify the DataPack. The DataPack is then submitted in step 250. On submission of the DataPack it can be queued and sent to its destination server which may happen immediately or at a later time based on connectivity.

In alternate embodiments, step 250 can be used as a trigger for step 230 and 240, where additional data is actually collected and made into a DataPack after user decides to do step 250.

In yet other embodiments, the initial context 210, may first query a remote database which could provide context for the current DataPack being created, for example pre-populating some of the fields, Meta Data, or options that would be included in the DataPack. This can also be repeated for more Capture data in 260. As a result this could be used for a new DataPack or modification update on a previous DataPack.

In alternate embodiments, step 230 can be auto-populating information while during step 220 and step 260.

Figure 3:
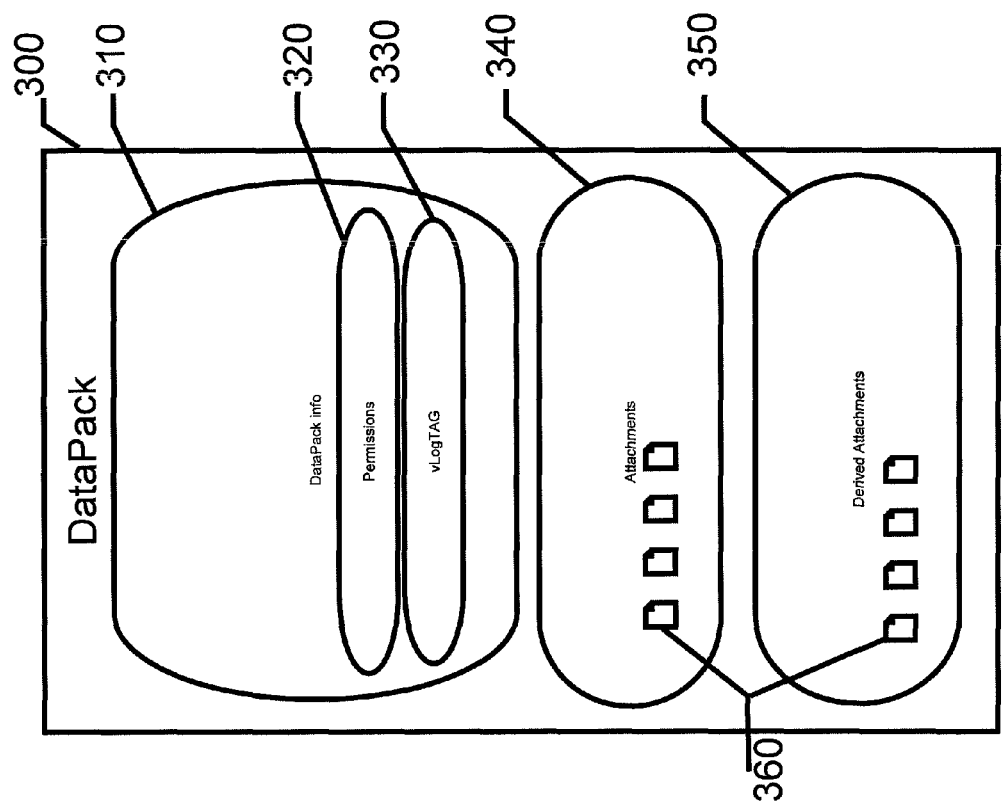
FIG. 3 depicts a logical structure DataPack.

Referring to the third sheet of the drawings, FIG. 3 depicts a logical structure DataPack. DataPack 300 is the encapsulating structure that includes components depicted in the FIG. 3. DataPack Info 310 represents the information pertaining to the DataPack as a whole. Examples of data in 310 includes, but is not limited to, Timestamp of DataPack Creation, GPS fix information of where DataPack was created, size of DataPack, last update on the DataPack, Additionally it can include Permissions 320 of which user or group is authorised to view, modify or delete. Since the data in DataPack may include data, which is collected over a period of time, DataPack info 310 could include vLogTAG 330, which includes a combination of timestamps with corresponding locations. It could also include custom events like RF signal strength, coverage quality, that occurred during that time period. This information can be later used to reproduce the sequence of events that occurred along with location information along with time. Attachments 340 may be included in the DataPack, which includes any type of attachments 360, including but not limited to, picture, audio files, text, documents, files, data logs, diagrams, screenshots. These attachments may within themselves contain Meta Data pertaining to the files themselves, e.g. a picture could have information about the type of camera used to take the pictures, and the camera settings.

In further embodiments, there could be Derived attachments 350, that were not necessarily present at the time of DataPack creation, but we associated with the DataPack at a later stage. For example, a voice attachment in 340, may go through an engine that can convert voice to text, and then be included as a derived attachment 350. In general, any data or tags that are included in the DataPack after the creation of the DataPack, will become part of the DataPack.

In alternate embodiments, 350 could include reference to other DataPacks can be auto-populating information while during step 220 and step 260.

In yet another embodiment, the DataPack can include the state of the DataPack, which could be as workflow information. For example, a DataPack can be created and marked as "pending approval". When the user with appropriate permissions marks this DataPack as approved, the state of the DataPack changes. This can be used to search for approved and "pending approval" DataPacks.

In some embodiments, multiple attachments 360 may have their own associated data information. For example, there can be multiple voice notes within a DataPack each having information about the data field with which the attachment is associated.

In yet another embodiment, the submission in step 250 may submit information about the DataPack or partial DataPack, optionally with derived attachments and Meta Data. It can also include an indication that the actual data is available and may be uploaded or made available at a later stage. As an example, and not limited to the following, a large video file attachment, may be deferred to be uploaded on submission, and only its thumbnail preview image may be uploaded as Derived attachments 350. Later upon suitable conditions, e.g. device being charged or in higher bandwidth coverage, it can submit the original attachment. There can be additional mechanism to "pull" this data for submission, when a server or other entity explicitly requests to view the attachment.

An example of a DataPack bundle according to the present invention can be created using a mobile device, such as a BlackBerry, which has a camera, keyboard, GPS hardware and a microphone. The data components being bundled can be pictures for example along with a video. A suitable application on the mobile keeps track of these media, and also attaches the location information obtained from the GPS. The user can also add some comments about the media. Additionally, a form generated showing multiple fields can be used for collecting other fields or automatically tagging or naming the voice file being recorded, based on the field currently highlighted in the application, while voice is being recorded. The application can also be recording the sequence of events, as in 330, which can be used for future playback of the sequence to create the DataPack. By the click of a button, this bundle can be sent via email or to a server over data channel, the DataPack identifier is then created. The DataPack identifier can be a string that includes the timestamp of when the DataPack was submitted for transmission, and the device's own unique identifier. Each of the files may be stored on a server location where the identifier of the DataPack bundle is a folder, and each of the files and notes are files within that folder.

Further a suitable user interface or a mobile application, can be used to create, use and transmit DataPacks. In one embodiment, a primary interface is employed. From the primary interface, a number of application-bound controls, also referred to herein as functionality keys, may be pre-assigned to invoke the portable device's specific data capture functionality. For example, on target platforms which provide momentary contact pushbutton switches or "Hot Keys" can be used where an operator's closure of any of these switches may cause the underlying software implementation to create a new pending DataPack for transmission, should one not be currently active. The software may then engage the corresponding data capture facility. When the selected switch is released, the capture is finalized and a reference to the newly captured object is registered for transmission in the DataPack, and an iconic representation of the object is immediately populated to the relevant attachment status panel of the primary interface. Additional controls are provided for the selection and attachment of pre-existing objects from the device's file system, as well as for the runtime screen image capture of the device's display state.

In an alternate embodiment, the underlying software implementation may simply register the newly-created and other associated objects by reference, and defer the creation and population of the new pending DataPack until such time as transmission of the record is to be actioned.

When pointer focus input is directed at the primary interfaces type-in panel, the operator may then input a textual note. A new text object is then created, and its reference is registered in the pending DataPack. The text entered is continually displayed in the entry panel, and the operator can return to edit or append to it at any time by re-establishing pointer focus.

An additional pre-assigned button is provided to invoke transmission of the current DataPack record. In the event of a degraded wireless path or other network condition that would prevent a successful transmission, a configurational option is provided to allow the operator to control the number of pending DataPack transmissions that are to be queued on the device. The embodying software implementation then caches the allotted transmissions for later automatic posting when network access conditions are favourable. As an optional feature, the primary user interface may display an visible indication of transmission queue status, for example the number of records that are pending transmission, and the time they have been holding in the queued state.

In a further embodiment, a type-in textual interface is provided for the creation of a named group of records, and a menu selector is available to allow the operator to choose with which group new DataPack records will be associated. Once such a selection is made, all future DataPack transmissions will carry the now-current grouping tag, until such time as the operator explicitly changes the group association setting. This feature allows for rapid capture and transmission of a series of related data sets without further human input interactions in this regard. An additional menu selector allows the operator to choose from a list which of the other operators enrolled in the system will be allowed to access the DataPack record, such that the software implementation can filter all subsequent retrieval attempts against this access control list.

Another embodiment of the invention applies to devices that are equipped with a Global Positioning System (GPS) receiver or other similar position derivation or interpolation subsystem. On a platform thus fitted, the primary interface will display a multi-state status indicator, wherein the first state may indicate whether the positional subsystem has a sufficient operational condition to achieve trusted locational coordinates, a second state may indicate a reading is not available, and such additional states may be provisioned as required to indicate location subsystem progress and operating conditions. Since continuous or even periodic operation of a GPS receiver or other positional subsystem may present a significant energy drain to a portable device's often sparse battery endowment, it is preferable that a control be provided which will disable such a receiver until the operator begins interaction with the application controls. In this case, when user input is detected, a software strobe signal may be generated, which can trigger the reactivation of the receiver, such that a location fix can be established concurrently with the operator's other activity. Under conditions where the devices battery charge life is not a concern, an additional control exists to allow the operator to select constant periodic acquisition of a location fix. When location information is available, it is automatically added to the pending DataPack record, with newer fixes replacing any extant location data.

In a further embodiment of the present invention, a status indicator may be presented, wherein a textual or iconic representation of the current status of the underlying software implementation may be displayed. Additionally, the software implementation may generate for display functional trace messages describing internal process flow and results, and such operational logging messages may be suppressed or displayed by their assigned importance or category, in a means that would be familiar to a practitioner of the art.

According to another embodiment of the invention, certain other information from foreign applications can be automatically mapped to and imported into the user interface. For example, if the operator has a meeting opened in the personal calendar application, the title of the meeting can be automatically applied to the currently pending DataPack, and similarly the meeting's attendees can be automatically pre-selected in the record's access control filter. In a similar example, if the operator has an electronic mail message opened for viewing or editing, the subject of the email message can be applied to the currently pending DataPack, and the message's recipient list extracted to the access control list.

In another embodiment of the invention there is provided a means to create a custom rapid-input form which will be associated with a grouping of DataPack records. This control allows the operator to enter a form specification defined in a document style semantics and specification language, such as the Extensible Markup Language (XML). The form specification may define the form elements and their data type, the default data to be initially populated, and input conditioning as whether a given field is mandatory or optional. When a form specification has been applied, the user interface may present a interactive representation of the form to the operator, which will be composed of the standard interface object classes known to a practitioner of the art, such that these data can be entered and associated with the currently pending DataPack record.

According to yet another embodiment of the invention, the interface provides an export facility, which when selected allows the user to create a binary object containing the contents of the currently constructed DataPack. This export object can then be manipulated using other applications, saved or transmitted via standard Multipurpose Internet Mail Extensions (MIME) or other electronic file transfer protocols.

Figure 4:
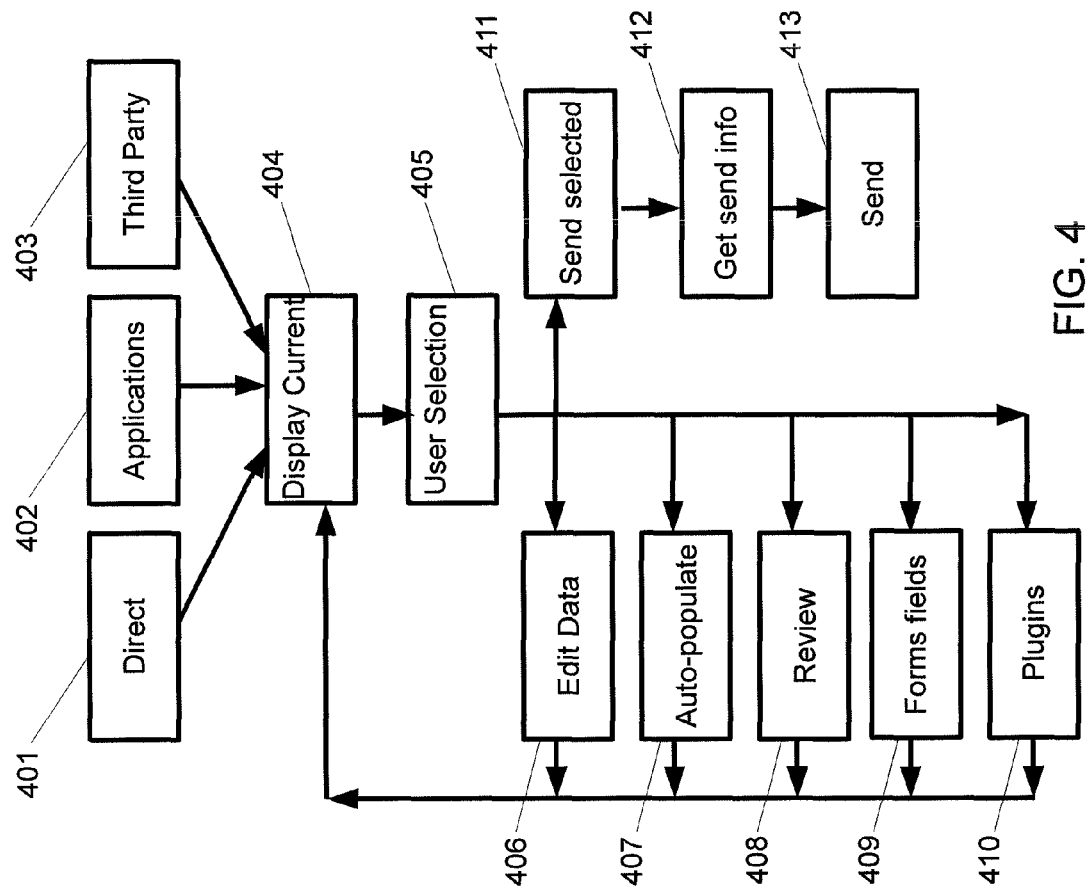
FIG. 4 depicts a flow-diagram of a user interface according to one embodiment of the present invention.
Figure 5:
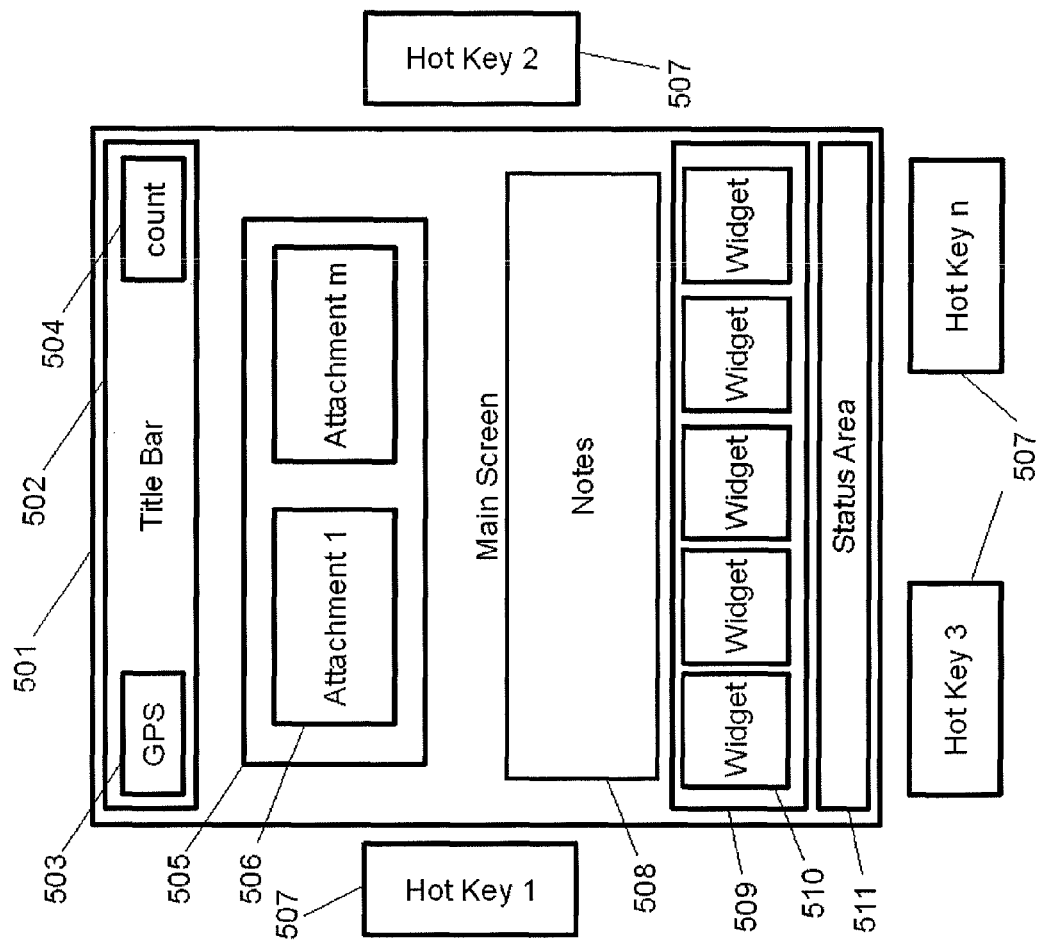
FIG. 5 depicts a schematic of a user interface according to one embodiment of the present invention.

FIG. 4 depicts a user interface according to one embodiment of the present invention which simplifies collection of multiple pieces of data or DataPack, using a single user interface. In this application, "vPost" refers to a user interface application according to an embodiment of the present invention. Referring to FIG. 4, 401, 402 and 403 depict different routes for triggering entry into the main user interface, an example of which is depicted in FIG. 5. A direct route 401 can be used for directly launching of a vPost application, for example by an application icon. Route 402 depicts an alternate entry route to a vPost application through other existing applications, and possibly providing its own context. For example, a calendar appointment could have a menu to open a vPost application, which would, upon launching, include relevant data from the meeting, like the attendees, the subject, location or other meta data related to the meeting. This would eliminate the need for the user to type this information. Similarly, route 403 depicts other third party applications that can launch vPost through interface exposed by the application, allowing it to provide its own set of contexts. In alternate embodiments the third party applications also install themselves as a plug-in into vPost application, so it could be called from within the application to provide other information.

404 depicts a state where the user is shown the status of what is being bundled. An example of a user interface which depicts the status of what is being bundled is depicted in FIG. 5. The user interface of FIG. 5 may have a customized look base on the entry route, so as to let the user know the context. In alternate embodiments, multiples of such states can be maintained by the application as "virtual sessions" each of which is a holding? state of different DataPacks being created. When in this mode, the user is given multiple user selection options 405, to precede using user input mechanisms, like menus, hot keys or other user interface components. The user could perform one of the actions 406-411 or decide to cancel or abort current bundling. In other embodiments, a configurable setting to map hardware hot keys to specific actions can be used to further simplify usability. For example, the right convenience key could be used to launch camera to take a picture or video to include in the DataPack. The mobile platform usually provides API (interfaces) to listen to key press events. One can programmatically listen to those key presses and perform appropriate actions. Step 406 depicts when user makes alterations to the data related to the DataPack, including removing components, adding or editing text or other metadata.

Step 407 depicts inclusions of data without active user action, and base on user settings. For example, if the user has enabled periodic GPS location fix, a newer location can automatically be appending or updated for the DataPack. In alternate embodiments, older cached locations can also be used, when the last fix is older than a configurable "location freshness timer". In yet another embodiment, 407 could automatically be applied when a user first arrives at 105 or has selected 411.

Step 408 provides an easy mechanism for the user to review in detail the DataPack contents, e.g. replaying audio or video files attached, or display in higher resolution or size of the pictures in the DataPack. In alternate embodiments, other metadata may be made reviewable, e.g. launching the map application to show the location that is being associated with the DataPack. In yet other embodiments, user interface can be provided to review the DataPacks that have already been bundled and put in queue for transmission.

For further easing entry of structured data or form fields, step 409 provides configurable forms for user entry. The fields could include convenient drop down choices, radio buttons, check boxes, or other form entry fields in use. In alternate embodiments, the fields could include a mechanism to tag media elements like audio or picture. For example, a form field "FamilyName" could be used to name the voice note being recorded while at that field, to begin with "FamilyName_" for ease of correlation of the voice attachment relating to the field. Similarly, the "FrontPermit" and "BackPermit" fields could be used to identify the corresponding pictures being attached.

As described in 403, step 410 depicts the user choosing to select a plug-in application that is launchable by vPost to perform corresponding actions for updating the DataPack.

Once the user is satisfied with the DataPack bundling, the user uses one of destinations to send in step 411. This would include embodiments where Hot Keys are used to select one of preconfigured destinations to send the DataPack to. The destination could be a server location using direct protocols, custom protocols, or via email or other standard messaging transports. In alternate embodiments, based on settings the user selection could automatically periodically trigger sending DataPacks, for example to track location or other relevant data.

Step 412 depicts the state where based on the send selected in step 411, the destination or destinations are extracted from the user settings, for the selected send trigger. In alternate embodiments, the DataPack could be assembled into a known format like zipped together, or into a pdf or PowerPoint slides, where all the relevant Data from the DataPack is bundled in to one binary, and possibly later re-extractable into individual data components.

Step 413 depicts the phase where the DataPack is sent to the destination. In a preferred embodiment, this step just puts the DataPack in an outgoing queue, and let user return to create more DataPacks, or do other things, while the DataPack gets transmitted in the background. Based on the settings the send could happen automatically or ask further confirmation from the user. In alternate embodiments, the send would launch a sending application, like the email application, with all known data already pre populated, but let the user further edit the data or destination before actually sending. In some embodiments the session is still maintained for the next DataPack bundling, and in other embodiments it could clear all data related to the current DataPack.

An example of a schematic for user interface using the idea is shown in FIG. 5. The principles of the present invention can be applied to create other user interfaces. A main screen 501 includes components which are used for the DataPack construction. Screen 501 can have its own user interface style, including background image, or colouring scheme, and could be dependant on the route of being launched, for example by routes 401, 402 or 403.

A title bar 502 holds information about the application, or other indications from the main mobile application, like battery remaining, wireless coverage etc. In this example, a location indicator 503 is provided, and the number of attachments currently in the DataPack is indicated by the count 504. Indicator 503 is used to describe to the user the status of the location. For example, a green icon could mean and new location fix is available, a yellow icon could mean there is an older fix available, while a red icon would show no fix currently available. It is also a convenient location for the user to select if GPS location is of interest or not. In alternate embodiments, other location provider sources like Cell-ID or WiFi based location providers could be displayed with an appropriate icon. Count 504 is an easy display of status of number of attachments currently in the session, but in alternate embodiments can also include status of previously uploaded DataPacks. As an example 4/10 in that location could indicate 4 uploads successful and 10 are still pending in the outgoing queue.

Field 505 of the screen includes the area where there is an indication of each of the attachments, depicted as preview panels 506, that are currently associated with the DataPack. In preferred embodiments, it shows a preview of the image, or videos attached, or a graphical representation of voice or sound attachments. In other embodiments, preview panels 506 could also be used to depict other data that is associated with the DataPack, for example form data or map of the location.

Many of the data capture devices have hard keys that can be used to ease interface into application. Hot keys 507 are hot keys that are customized to perform a specific task, typically in response to a Widget action 510. As an example, a Left convenience key on a BlackBerry can be mapped to a voice recording Widget, that starts a recording when an associated Hot Key is pressed. Similarly, a right hot key can be mapped to launch a camera application. In one embodiment of the present invention, a Hot Key such as the "Send" key on a mobile device can be mapped to one of the sending destinations, as in steps 411 and 412.

A note field 508, provides an easy interface for users to add a text note to DataPack. In alternate embodiments, selecting the note could provide larger user interface space for ease of entering longer notes.

Field 509 depicts the area where different action Widgets 510 are displayed. In one embodiment, field 509 provides mechanism for each user to customise the sequence and visibility of any of the 510. 510 indicates an action widget, which include actions for capturing data elements, editing attached elements or sending DataPack to the configured destination, as in step 412.

Field 511 is a convenient location to display the status of on going activities on the screen. It could include information about that event that occurs, or help related to the highlighted widget or user interface component.

The application as described above can be very useful for many different users. For example, an insurance agent that needs to go to locations of accident to collect information can very conveniently use the application. The agent would use image capture widget to take multiple pictures of vehicles in accidents, use the voice recoding hot key to add a note to the DataPack and use a Send hot key to send the DataPack already bundled into a predetermined destination on the server or an en email address. The DataPack would auto-populate the location, and the agent has the option to add a note or fill in an appropriate form. The ease of the user interface allows the agent to perform the tasks with minimum overhead of trying to correlate and bundle related information into on structure.

What is claimed is:

1. A mobile device comprising a screen, a data capture device, a device memory, and a data capture user interface comprising:

functionality configured to invoke a data capture session for bundling data objects into a DataPack comprising a structured data collection at the mobile device;

data capture functionality configured to activate the data capture device for capturing, a plurality of captured data objects during the data capture session, wherein at least one of the plurality of captured data objects is newly acquired by the mobile device from a data source during the data capture session;

functionality configured to store the plurality of captured data objects in the device memory as associated with the data capture session;

at least one preview panel for only displaying a representation of the plurality of captured data objects associated with the data capture session for editing on the screen;

functionality configured to select at least one of the plurality of captured data objects in response to a user input at the user interface and bundle the selected at least one of the plurality of captured data objects into the DataPack at the mobile device; and functionality configured to invoke assignment of a unique identifier on the mobile device during a data capture session to the selected at least one of the plurality of captured data objects to create the DataPack.

2. The device of claim 1 further comprising functionality configured to display a field on the screen containing at least one type-in line for the input of textual notations.

3. The device of claim 1 wherein activation of the data capture functionality causes capture of a captured data object and display of a representation of the data object in the preview panel.

4. The device of claim 3 wherein the captured data objects are selected from the group consisting of an image, a digital audio recording, a video recording, data from a wireless connection, and location data.

5. The device of claim 1 further comprising functionality configured to launch transmission of the Datapack.

6. The device of claim 5 wherein the functionality configured to launch the transmission is selected from the group consisting of a hot key and a widget on the mobile device whereby the hot key or widget is mapped to a particular transmission destination.

7. The device of claim 5 wherein the transmission occurs in the background without impeding other applications.

8. The device of claim 1, wherein the functionality configured to invoke assignment of a unique identifier is selected from the group consisting of a hot key and a widget on the mobile device which is mapped to the data capture functionality whereby activation of the hot key or widget activates the data capture functionality.

9. The device of claim 1 further comprising functionality to generate a template form to which one or more data objects can be assigned.

10. The device of claim 1 further comprising functionality configured to invoke the data capture session through a selected application, wherein a context for the DataPack is provided by the selected application.

11. The device of claim 1 further comprising a context based status indicator that indicates a status of the Datapack.

12. A method of capturing and displaying data on a mobile device, the mobile device comprising a device memory, a data capture device, a preview panel and a data capture bundling application, the method comprising:
   (a) activating the data bundling application and opening a data capture session on the mobile device for bundling data objects into a DataPack comprising a structured data collection;
   (b) activating the data capture device in response to activation of the data bundling application;
   (c) acquiring, during the data capture session, a plurality of data objects using the data capture device and storing the data objects in the device memory as associated with the data capture session, wherein at least one of the plurality of captured data objects is newly acquired by the mobile device from a data source during the data capture session;
   (d) displaying, during the session, only the plurality of captured data objects associated with the data capture session for editing in a preview panel on the mobile device;
   (e) selecting at least one of the plurality of captured data objects for bundling into the DataPack in response to a user input at the user interface;
   (f) bundling the selected at least one of the plurality of captured data objects acquired by the data capture device to create the DataPack; and
   (g) assigning a unique identifier on the mobile device to the DataPack during the data capture session.

13. The method of claim 12 further comprising a send application and activating the send application to send the DataPack to at least one destination.

14. The method of claim 13 wherein the data newly acquired from the mobile device from a data source during the data session is selected from the group consisting of an image, a digital audio recording, a video recording, data from a wireless connection, and location data.

15. The method of claim 14 wherein the data not newly acquired by the mobile device from a data source during the data session is selected from the group consisting of an image, a digital audio recording, location data, a video recording, data from a wireless connection, and text.

16. The method of claim 12 further comprising opening a session of another application, activating the data bundling application from the another application and providing a context for the DataPack through the another application.

17. The method of claim 16 further comprising transferring data from the another application to the DataPack.

18. The method of claim 12 further comprising providing a functionality key mapped to a certain destination and sending the DataPack to the certain destination.

19. The method of claim 18 further comprising displaying the status of the sending of the DataPack.

20. The method of claim 12 further comprising a template associated with the DataPack and auto-populating at least a portion of the template.

21. The method of claim 12 further comprising acquiring other data and storing the other data in the device memory and bundling the other data with the selected at least one of the plurality of captured data objects to create a DataPack.

22. The device of claim 1 further comprising functionality configured to acquire other data and wherein the functionality configured to bundle the selected at least one of the plurality of captured data objects to create a DataPack further comprises bundling the other data with the selected at least one of the captured data objects.

23. The device of claim 1 further including functionality configured to continuously collect data objects during a data capture session.

24. The method of claim 12 wherein in step (c), further comprising continuously collecting at least some data objects during the session.

* * * * *